March 26, 1957 R. C. FERGUSON 2,786,640
THROTTLE AND REVERSIBLE PITCH PROPELLER INTERLOCKING MEANS
Filed Dec. 31, 1953 2 Sheets-Sheet 1
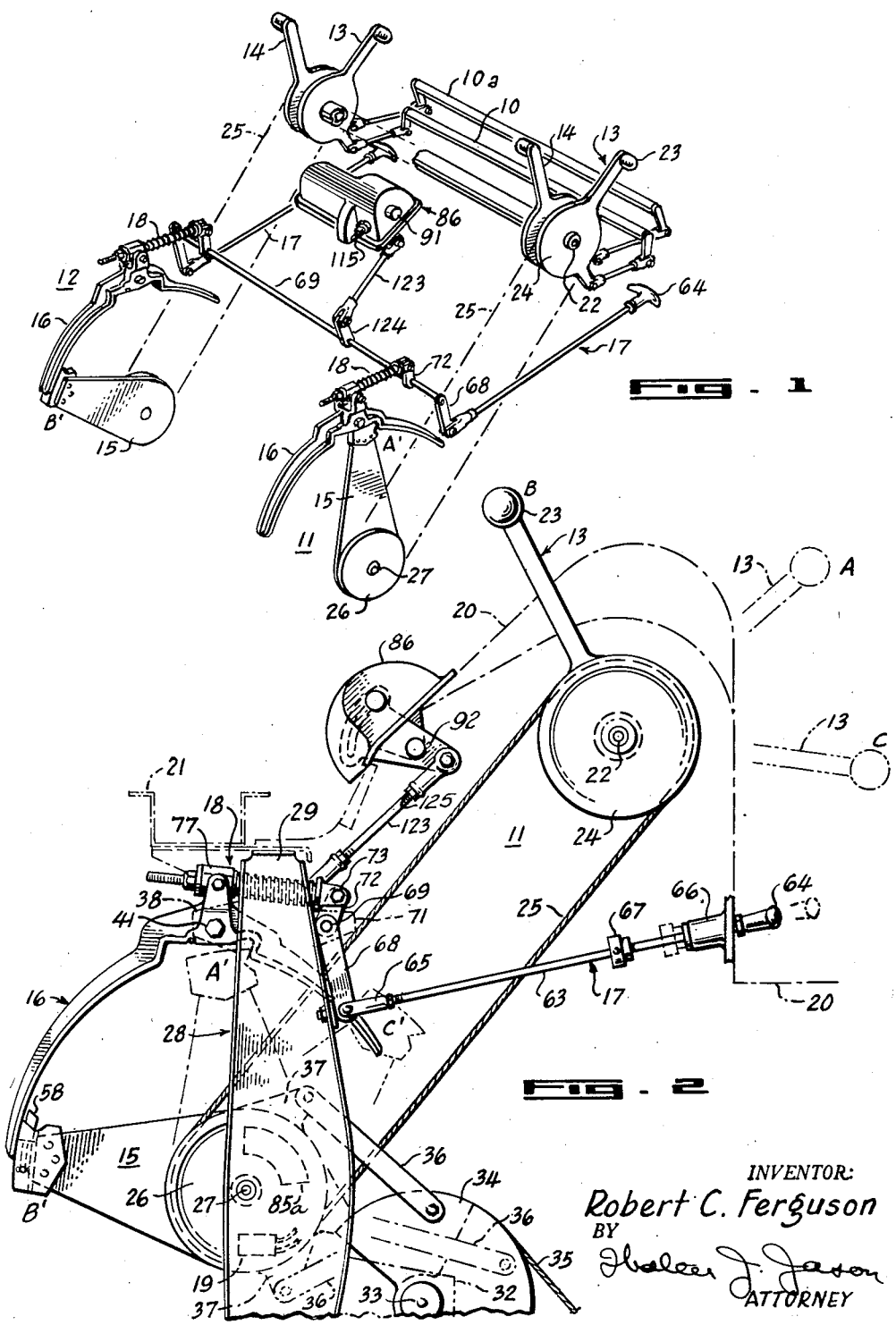
INVENTOR:
Robert C. Ferguson
BY
ATTORNEY March 26, 1957 R. C. FERGUSON 2,786,640
THROTTLE AND REVERSIBLE PITCH PROPELLER INTERLOCKING MEANS
Filed Dec. 31, 1953 2 Sheets-Sheet 2
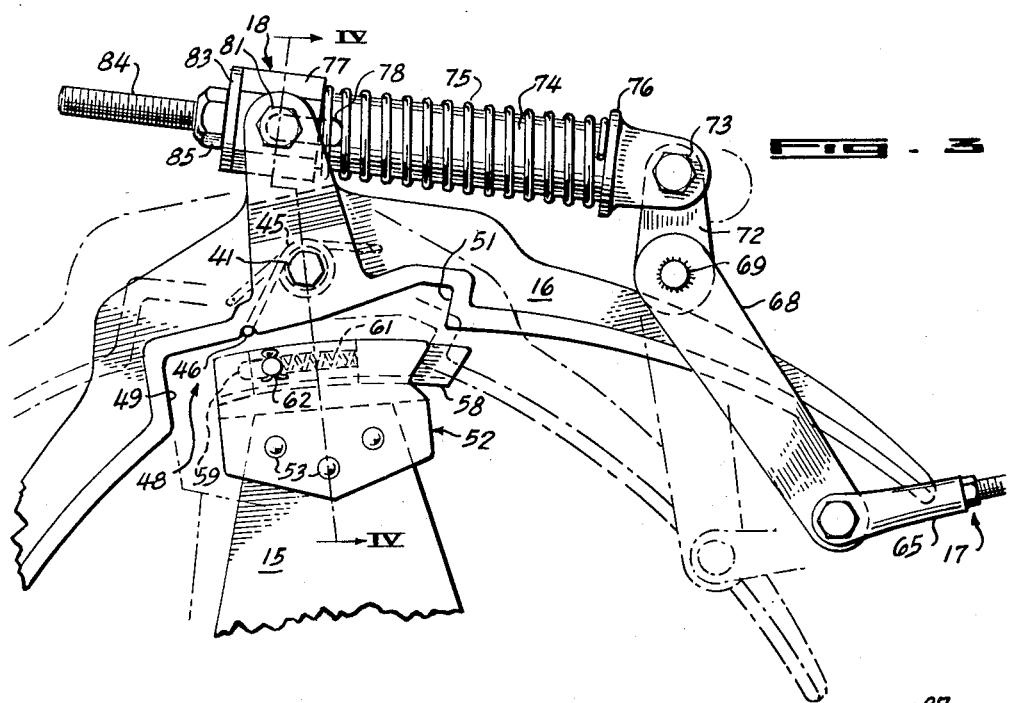
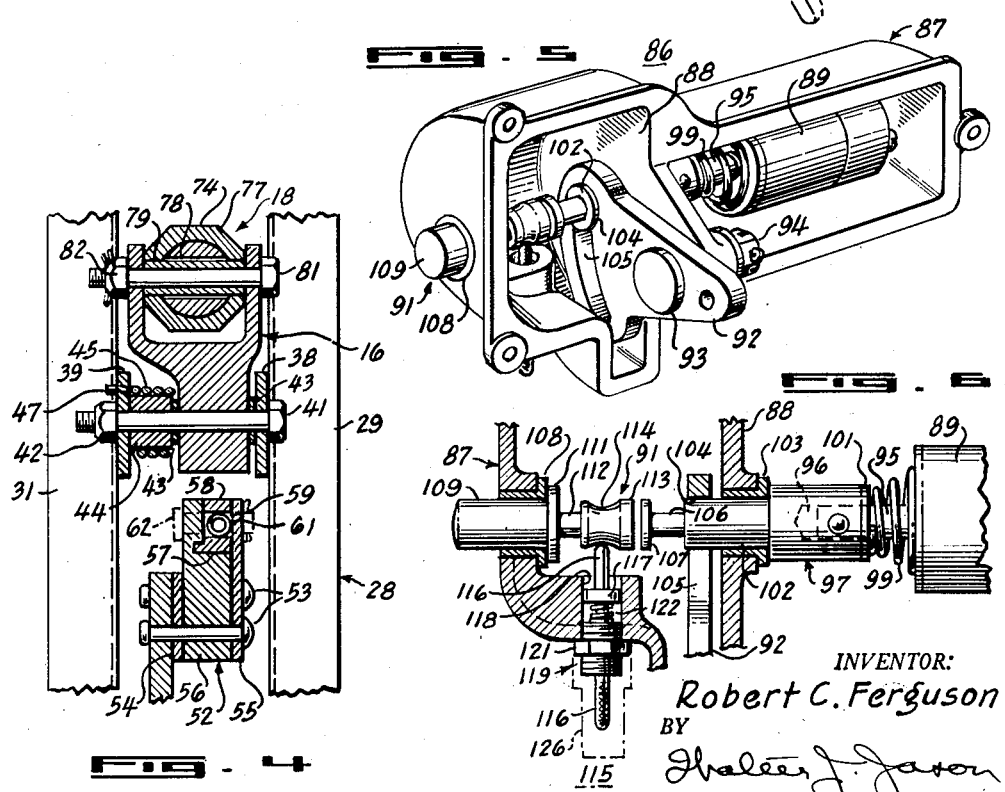
INVENTOR:
Robert C. Ferguson
BY
ATTORNEY United States Patent Office 2,786,640
Patented Mar. 26, 1957

2,786,640

THROTTLE AND REVERSIBLE PITCH PROPELLER INTERLOCKING MEANS

Robert C. Ferguson, San Diego, Calif., assignor, by mesne assignments, to General Dynamics Corporation, a corporation of Delaware Application December 31, 1953, Serial No. 401,679

13 Claims. (Cl. 244—81)

This invention relates to throttle controls and more particularly to throttle controls operatively associated with a propeller reversing mechanism.

An object of the present invention is the provision of an improved form of throttle control adapted for preventing inadvertent manual actuation of the propeller reversing mechanism.

Another object of the present invention is to provide an improved engine throttle control which embodies a throttle control lever manually operable to effect control of the engine while the propeller is at normal pitch, and operable to initiate a reversal of the propeller pitch and effect control of the engine while the propeller is at reverse pitch.

A further object of the invention lies in providing a unique engine throttle control which, in the same direction of movement, is adapted sequentially for adjusting the engine speed from high to idling speeds, for effecting actuation of the propeller reversing mechanism, and for adjusting the engine speed from idling speed to high speed with the propeller in reverse pitch to thereby achieve slowing or braking of the aircraft during its landing run.

Another object of the invention is to provide a novel throttle control which embodies a locking apparatus separably operable for permitting actuation of the propeller reversing mechanism by the throttle control.

It is yet another object of the invention to provide a throttle control of improved form which is comparatively simple and economical of manufacture.

Other objects and features of the present invention will be readily apparent to those skilled in the art from the following specification and appended drawings illustrating certain preferred embodiments in which:

Figure 1 is a perspective view of a throttle control mechanism, according to the present invention, supporting structure being omitted for clarity;

Figure 2 is a side elevational view of one throttle control assembly, portions of the supporting structure being shown in phantom.

Figure 3 is a detail side elevational view of a portion of the throttle control mechanism;

Figure 4 is a sectional view taken along line IV—IV of Figure 3;

Figure 5 is a detail perspective view of the solenoid assembly which serves to prevent actuation of the propeller reversing mechanism until the airplane is on the ground; and Figure 6 is a detail view of a portion of the solenoid assembly.

Referring to the drawings and more particularly to Figure 1, there is illustrated an embodiment of the invention which is adapted for use in connection with a two engine aircraft although it will be apparent from the description hereinafter made that the invention is not limited in its application to an aircraft having any particular number of engines. Since here it is assumed that there are two engines to be controlled the present embodiment will comprise a pair of throttle control assemblies 11 and 12 with assembly 11 being assumed, for purposes of description of this invention, as being directly operatively associated with the port engine (not shown) of the aircraft for adjusting and controlling the speed thereof, and throttle control assmbly 12 assumed as being directly operatively associated with the starboard engine (not shown). However, each of assemblies 11 and 12 includes a pair of throttle lever means 13 and 14, throttle lever 13 assembly 11 being adapted for direct operation of assembly 11 and throttle lever 14 being adapted for direct operation of assembly 12. In addition, throttle lever 13 of assembly 12 is adapted to effect operation of assembly 11 through a suitable connection or coupler 10 to lever 13 of assembly 12. Similarly, lever 14 of assembly 11 is adapted for operation of assembly 12 through a suitable coupling interconnection 10a which joins the pair of levers 14. With this arrangement it is evident that an operator located at either assembly 11 or 12 can, by manipulation of levers 13 and 14, operate either or both of assemblies 11 and 12 to thereby operate either or both engines of the aircraft, as desired. It is understood that the specific construction of the interconnections 10 and 10a between the two pairs of levers 13 and 14 forms no part of the present invention and that the present invention contemplates any coupling interconnection suitable for selectively effecting movement of one assembly from the other.

Assemblies 11 and 12 are substantially identical to each other and for this reason the description hereinafter made will be primarily directed to assembly 11. In addition to movable engine throttle levers 13 and 14, assembly 11 comprises a throttle arm 15, a pivotable locking hook 16, an arming mechanism 17, an override mechanism 18, and a reversing switch 19, as best seen in Figure 2. Reversing switch 19 is suitably interconnected to the usual propeller reversing mechanism (not shown) of the airplane to control the operation of the propellers.

To adjust and control the speed of either or both engines, throttle levers 13 and 14 are arranged in juxtaposition, as illustrated, whereby the pilot or co-pilot may conveniently manipulate levers 13 and 14 as desired. As hereinbefore stated, levers 13 and 14 of assembly 11 function to operate not only assembly 11 but also to operate assembly 12 through the suitable interconnecion 10a provided between the pair of levers 14.

Movement of throttle lever 13 serves to actuate, or initiate the movements of, the various components of assembly 11 which are necessary to effect changes in the pitch of the propeller and in the speed of the port engine. Such movement of lever 13 will now be described, including the location of lever 13 at various propeller pitches and engine speeds.

In its operation of assembly 11 movement of throttle lever 13 in a forward or counterclockwise direction, as viewed in Figure 2, from a neutral position, indicated at A, to a most forward position, indicated at B, initiates a progressive increase in the speed of the engine with which it is associated, which here it is assumed would be the port engine. Similarly, forward movement of throttle lever 14 of assembly 11, through the interconnection 10a between it and lever 14 of assembly 12 operates the latter assembly to effect an increase in the speed of the starboard engine.

Initial rearward movement of lever 13 toward its most rearward position, indicated at C, first effects actuation of the reversing switch 19, which in turn effects reversal of the propeller. Continuing rearward movement of lever 13 progressively increases the speed of the port engine, for the arrangement illustrated, until position C is reached, in which position the engine is at full speed with the propeller in reverse pitch.

Movement of lever 14 of assembly 11 in a manner corresponding to the described rearward movement of lever 13 actuates lever 14 of assembly 12 to effect similar reversal of the propeller of the starboard engine and an increase in the speed of the engine upon continued rearward movement of lever 14.

A pedestal 20, which is located in the pilot's compartment of the aircraft, serves as the primary supporting structure for the throttle control device herein described and inasmuch as its particular construction forms no part of the present invention it is indicated in the drawings merely by phantom lines. Pedestal 20 is fixedly connected at its forward portion to a lateral support 21, in turn, is rigidly carried by the walls of the aircraft in a conventional manner, while the base of pedestal 20 is rigidly secured to the floor of the aircraft by any suitable nut and bolt assemblies (not shown).

Lever 13 is fixedly mounted to a bearing shaft 22 which is rotatably mounted to pedestal 20, lever 13 embodying a handle portion 23 at one end and a circular pulley or sheave 24 at the other end. Sheave 24 is peripherally grooved to accept a cable 25 which is maintained, in conventional manner, in firm, nonslipping relationship, as by clips, retainers, or the like. Cable 25 is also fitted about a sheave 26, which is located at the lower end of arm 15, and is rigidly carried by a shaft 27, in turn being rotatably mounted and suitably carried by a supporting structure 28. Supporting structure 28 which is comprised of a pair of elongated supporting brackets 29 and 31, spaced as illustrated in Figure 4, forms a portion of pedestal 20, and is rigidly secured to the floor of the aircraft at the pilot's compartment in a conventional manner. It is evident that with this arrangement rotational movement of throttle lever 13 in either a clockwise or counterclockwise direction will effect a corresponding rotational movement of sheave 26 through the operative connection provided by cable 25.

To the lower end portion of each of brackets 29 and 31 of supporting structure 28 there is rigidly secured a quadrant support 32, one of which is indicated in Figure 2. These quadrant supports 32 are laterally spaced and serve to rigidly carry a bearing shaft 33 upon which is rotatably mounted a throttle quadrant 34. Throttle quadrant 34 is suitably peripherally grooved to accept a pair of usual throttle cables, one of which is indicated in Figure 2 at 35, at these throttle cables extending rearwardly to operative connection in the conventional manner with the engine carburetor mechanism which effects adjustment and control of the speed of the engine.

A throttle link 36 is pivotally connected between an ear 37, which is integral with sheave 26, and throttle quadrant 34 whereby movement of throttle lever 13, and corresponding rotation of sheave 26, is transmitted to quadrant 34, consequently moving the throttle cables to thereby effect adjustment and control of the speed of the engine. It is noted that when throttle lever 13 is in its idling or neutral position A, throttle link 36 will lie substantially in alignment with the center of sheave 26, as indicated in dash-dot outline in Figure 2, this position of link 36 being herein termed the neutral position of link 36.

Movement of throttle lever 13 from neutral position A to position B causes a counterclockwise rotation of sheave 26 and a consequent counterclockwise rotation of throttle quadrant 34 to effect, through the throttle cable at 35, an increase in speed of the associated port engine. Similarly, movement of throttle lever 13 from neutral position A to position C causes a clockwise rotation of sheave 26 and a consequent counterclockwise rotation of throttle quadrant 34 which also effects an increase in the speed of the engine, this latter increase in the speed of the engine occurring with the propeller of the engine in reverse pitch, as will be more fully described hereinafter. It will be apparent from the full outline and the two dash-dot outline representations of link 36 in Figure 2 that link 36 is so moved by its connection to sheave 26 that it effects counterclockwise rotation of quadrant 34 regardless of the direction of movement of throttle lever 13 from its neutral position.

In addition to causing the rotation of throttle quadrant 34, movement of throttle lever 13 also effects a corresponding rotation of throttle arm 15 whereby when lever 13 is in position B, arm 15 is in position B' and when throttle lever 13 is in position A, arm 15 is in position A', and when lever 13 is in position C, arm 15 is in position C' (the latter two positions being shown in dash-dot outline in Figure 2). The upper end of arm 15 maintains sliding engagement with some portion of the inner periphery of locking hook 16 except when arm 15 is in its neutral or idling position A'. Any appropriate stops (not shown) may be provided for preventing the movement of arm 15 beyond its extreme positions B' and C'.

Locking hook 16 is seen to be arcuate in shape and pivotally supported at approximately its mid-portion between a pair of mounting plates 38 and 39 (Figure 4) which are suitably and rigidly connected to the upper portions of supporting brackets 29 and 31, respectively. In addition, as illustrated in Figures 3 and 4, a bearing bolt 41, which is disposed through plates 38 and 39 and rigidly secured in position by a nut 42, serves to rotatably carry hook 16 and a pair of washers 43, which washers serve to space and prevent binding or galling between hook 16, plate 38, and a cylindrical bushing 44 carried by bolt 41.

A spring 45 is disposed about bushing 44, one end or tang 46 of spring 45 being secured within a suitable depression or groove in the underside of the mid-portion of hook 16, Figure 3, and the other end or tang 47 of spring 45 being disposed within a suitable opening in mounting plate 39 whereby spring 45 exerts its bias to urge locking hook 16 clockwise from its release position of Figure 3. Thus, spring 45 will always tend to urge hook 16 toward the locking position illustrated by the dash-dot lines in Figure 3. The mid-portion of locking hook 16 embodies a transverse, radially extending cut-out portion or recess 48 which is characterized by a shoulder 49 and a shoulder 51, as illustrated. It is apparent that when the upper end of throttle arm 15 is housed within recess 48, locking hook 16 is desirably free for rotation about its pivot 41 either clockwise or counter-clockwise without interference between hook 16 and arm 15.

Throttle arm 15 is provided with a latching head 52 on its upper end, head 52 being rigidly secured to arm 15 by any suitable fasteners, such as by rivets 53 or the like. Head 52 includes a pair of spacer plates 54 and 55 between which is secured a latch carrier 56, carrier 56 in turn being suitably machined to provide a longitudinally extending slot 57 adapted for slidably containing a latch 58.

Latch 58 embodies a transverse slot 59 within which a spring 61 is housed, spring 61 being suitably secured to, and exerting its bias against, latch 58 and a pin 62 which is fixedly disposed through carrier 56, transverse slot 59, and plate 55 whereby spring 61 normally urges latch 58 to the right, as viewed in Figure 3. Thus, a portion of latch 58 tends to project exteriorly of latching head 52, as illustrated in Figure 3.

When throttle arm 15 is rotated in clockwise direction from position B' to idling position A', as illustrated in Figure 2, it is seen that latching head 52 will contact shoulder 51 of locking hook 16 whereby further clockwise movement of arm 15 toward the reversing position at C' is prevented. This inability of arm 15 to move into the reversing position at C' is made evident to the pilot or operator because he is correspondingly unable to move throttle lever 13 rearwardly. It is noted that on engagement of latching head 52 with shoulder 51 of locking hook 16 latch 58 is forced inwardly against the bias of spring 61 for a purpose to be described.

It is apparent that clockwise movement of throttle lever 13 to its rearward position C cannot be had until locking hook 16 is rotated counted-clockwise to thereby permit further clockwise movement of arm 15. Thus, a deliberate unlocking movement of hook 16 is required of the operator before arm 15 can be moved toward its reversing position at C' to actuate the propeller reversing mechanism and increase the speed of the engine with the propeller in reverse pitch.

The means by which the pilot or operator disengages latch 58 from shoulder 51 to permit the reversing operation is herein conveniently referred to as arming mechanism 17.

Mechanism 17 (Figure 2) comprises a rod 63 which embodies at its right end a T handle 64, and, at its opposite end, a turnbuckle adjustment member 65 for adjusting the length of rod 63 as desired. Rod 63 is slidably supported within a mounting bracket 66, which in turn is rigidly secured to pedestal 20 by any suitable fastening means, the sliding movement of rod 63 within mounting bracket 66 being limited by a stop member 67 which is secured to rod 63, as illustrated. Thus, movement of rod 63 to the right as viewed in Figure 2 is limited by virtue of the contact of member 67 with bracket 66.

Rod 63 is pivotally secured at its left end to a lower link 68 which is rigidly mounted at its other or upper end, as by welding, to a shaft 69 transversely disposed through and rotatably supported by a pair of laterally spaced supporting plates, as at 71, which plates are suitably fixed to supporting brackets 29 and 31 at each side of pedestal 20. It is to be noted that shaft 69 is common to both throttle control assemblies 11 and 12. An upper link 72, welded at its lower end to shaft 69, is pivotally secured at its upper end to override mechanism 18 by conventional fasteners, such as a suitable nut and bolt assembly 73.

Override mechanism 18, as best illustrated in Figures 3 and 4, comprises a substantially cylindrical body portion 74 about which is disposed a spring 75, the right and left ends of spring 75 bearing against a shoulder 76 of portion 74, and against a nut 77, respectively, nut 77 being slidably disposed about portion 74. As previously described, the right end of portion 74 is pivotally connected to upper link 72 by assembly 73. The left end of body portion 74 is provided with an elongated diametral slot 78 through which is slidably disposed a bushing 79 with a freely movable bolt 81 disposed therethrough. The ends of bolt 81 project outwardly of portion 74 and are carried by the opposite walls of nut 77, bolt 81 being secured in position by a castellated nut 82. It is to be noted that the length of bushing 79 is made slightly greater than the horizontal thickness of nut 77 to thereby enable nut 77 to pivot freely about bolt 81 even after nut 82 is firmly tightened.

The action of spring 75 against nut 77 tends to urge nut 77 and bolt 81 to the left portion of slot 78, this leftward movement being adjustably limited by a washer 83, which is carried by a threaded, reduced diameter portion 84 of body portion 74 and secured thereon by a nut 85.

It will be apparent that when the pilot or operator pulls T handle 64 outwardly or to the right, as viewed in Figures 2 and 3, rod 63 will also be moved to the right, and links 68 and 72 will be rotated counter-clockwise, consequently moving override mechanism 18 to the left. The force which is required to compress spring 75 is sufficiently high that this leftward movement of mechanism 18 is transmitted, without appreciable compression of spring 75, against nut 77 to thereby pivot locking hook 16 counter-clockwise about bearing bolt 41 to carry shoulder 51 away from latching head 52 of arm 15 and out of engagement with latch 58. Latch 58, which was in its compressed position, upon being freed snaps outwardly into its projected position. Figure 3 illustrates the position of the various parts after latch 58 has been freed and with the operator still maintaining a pulling force on handle 64. Next, upon release by the operator of T handle 64, the bias of spring 45 takes effect and serves to rotate hook 16 clockwise about its pivot bolt 41 into slidable engagement with the upper surface of projected latch 58; throttle control assembly 11, thus, will occupy its armed position (not shown). It is apparent that with the elements in their armed position the upper end of arm 15 is capable of being slidably moved along the under surface of the right leg of hook 16; thus arm 15 is now free for clockwise rotation. With arm 15 freed, movement of throttle lever 13 by the operator clockwise from position A to position C effects a corresponding rotation of arm 15 around the inner periphery of hook 16 to position C; illustrated in dash-dot outline in Figure 2.

A camming plate 85a, rigidly affixed to the side of sheave 26, is adapted, upon rotation of sheave 26, to effect actuation of reversing switch 19, switch 19 being provided for the purpose of initiating the operation of the propeller reversing mechanism in a manner well known to those skilled in the art. Such actuation of switch 19 by plate 85a occurs just subsequent to the rotational movement of throttle arm 15 clockwise from position A' to C', and is effected by the camming surface of plate 85a riding against actuating elements (not shown) of switch 19 in the usual manner. The operation of reversing switch 19, in turn, causes the propeller to reverse in pitch, such reverse pitch being used for the braking or slowing of the aircraft during landing.

By virtue of the construction just described, it is apparent that initial movement of throttle lever 13 from position A toward position C effects actuation of the propeller reversing mechanism, and continued clockwise movement of lever 13 to position C causes a progressive increase in the speed of the engine of the airplane with the propeller in reverse pitch; however, it is here again pointed out that no movement of throttle lever 13 toward position C can occur until the pilot or operator deliberately pulls T handle 64. Thus, the possibility of inadvertent actuation of the propeller reversing mechanism is substantially eliminated. An additional feature of the present invention which prevents inadvertent or premature reversing of the propeller is provided by a solenoid assembly 86, to be described hereinafter in greater detail.

Throttle control assembly 12 as above stated is substantially identical to throttle control assembly 11, embodying a similar pair of throttle levers 13 and 14, locking hook 16, throttle arm 15, arming or release mechanism 17, override mechanism 18, and reversing switch 19 whereby adjustment and control of the starboard engine of the aircraft can be had, all in a manner substantially identical to that just described in connection with throttle control assembly 11. Assemblies 11 and 12 are substantially independent of each other, only shaft 69, solenoid assembly 86, and the interconnections 10 and 10a between the pairs of throttle levers 13 and 14 being common to assemblies 11 and 12. The interconnections between the throttle levers 13 and 14 of assembly 11 and of assembly 12, as stated previously, serves to enable a pilot or operator to control and adjust the speed of both of the engines of the aircraft in either forward or reverse condition by manipulation of the pair of throttle levers 13 and 14 of either throttle control assembly 11 or assembly 12, this arrangement being desirable by virtue of the conventional practice of alternately employing a pilot or co-pilot for the operation of a multi-engine aircraft.

In the event of the failure of one of the engines of the aircraft it is common practice to effect the feathering of the propeller of that engine, moving the throttle lever for the disabled engine forward or counterclockwise to position B, as viewed in Figure 2, to thereby enable manipulation of the adjacent and remaining throttle lever without interference from the throttle lever of the disabled engine. For example, assuming that the starboard engine is disabled, the throttle lever controlling that engine, that is, the throttle lever 14 for throttle control assembly 12, would be moved forward or counterclockwise either by manual manipulation of throttle lever 14 of assembly 12 or by manipulation of its interconnected lever 14 of assembly 11, with consequent movement forward or counterclockwise of the corresponding assembly 12 throttle arm 15 to the position indicated at B' in Figure 1. With throttle arm 15 in its B' position it will act to prevent pivotal rotation of hook 16 of assembly 12 so that manual operation of override mechanism 17 of assembly 12 will have no effect on assembly 12. Now, assuming further that the aircraft is landing and it is desired to utilize the braking effect of the remaining or port engine, it is apparent that actuation by the operator of the port propeller reversing mechanism must occur. To effect such actuation, throttle arm 15 of throttle control assembly 11 must be free to rotate clockwise toward its position C, and, as previously described, T handle 64 must be pulled outwardly to provide this freedom by rotating hook 16 in a counterclockwise direction out of the path of arm 15. However, with the throttle arm 15 of assembly 12 in its forward position B', as illustrated, its associated locking hook 16 is locked against counterclockwise rotation and hence the rotation of shaft 69 cannot freely occur. Since shaft 69 is common to both assemblies 11 and 12 T handle 64 of assembly 11 is therefore restrained from being readily pulled outwardly. However, by exerting additional pulling force on T handle 64, the operator can overcome the locking effect of the throttle arm 15 of assembly 12, that is, the additional pull will serve to rotate shaft 69 to move override mechanism 18 of assembly 12 to the left, this rotation will be against the compressive force of spring 75 and will compress spring 75 of mechanism 18 and locate its bolt 81 in position at the right end portion of slot 78. This operation for overcoming override mechanism 18 also results in the counterclockwise rotation of locking hook 16 of assembly 11 and consequent freeing of its associated throttle arm 15 whereby a clockwise rotation of arm 15 can be effected toward its position C' to achieve a braking condition for the functioning port engine.

It will be apparent that if the disabled engine had been the port engine, throttle control assembly 12 could be operated, in a manner substantially as described in connection with assembly 11, to thereby achieve a braking condition for the starboard engine during landing of the aircraft.

As stated, hereinabove, after the operator has pulled T handle 64 outwardly, throttle lever 13 may be rotated toward its position C for effecting both an actuation of the propeller reversing mechanism and an increase in the speed of the engine with the propeller in such reverse pitch. However, it is highly undesirable to operate the propeller in such reverse pitch until the aircraft is firmly on the ground in a landing attitude, the description thus far having assumed that the pilot or operator waited until that time before operating the T handle of either assembly 11 or assembly 12. In this connection, solenoid assembly 86 is provided to insure that the pilot cannot actuate assemblies 11 and 12 until the aircraft is firmly on the ground, as will be seen.

Solenoid assembly 86, as illustrated in Figures 2, 5, and 6, is rigidly secured to pedestal 20 and comprises a housing 87 which is divided into two compartments by wall 88. Within one compartment there is longitudinally disposed a solenoid 89 which is rigidly secured therein by any suitable fastening means such as by a metal bracket and screws (not shown). Within the other compartment there is located an unlocking assembly 91 which is operatively associated with a link 92 pivotally secured to wall 88 by a bolt 93 which is secured in position by a nut 94. Solenoid 89 is conventional in construction and includes a movable core 95 adapted for movement to the right, as viewed in Figures 5 and 6, upon energization of solenoid 89. The outer end of core 95 extends within a bore 96 of a slide element 97, being held therewithin by a rivet 98. A spring 99 is disposed about the exposed portion of movable core 95, exerting its bias against the left end of solenoid 89, as viewed in Figure 6, and against a washer 101 which is disposed in abutment with the right end of slide element 97.

Slide element 97 embodies a reduced diameter slide portion 102, the shoulder thereby formed normally being located in abutment with a bushing 103 which is press fitted within a suitable opening in wall 88 of housing 87, and serves to slidably guide and support slide element 97.

When solenoid 89 is de-energized, the left end of portion 102 extends into that compartment of housing 87 within which link 92 is located, and projects through an enlarged portion 104 of an arcuate slot 105 provided in link 92, as illustrated. It is here noted that the diameter of slide portion 102 is greater than the width of slot 105 except for enlargement 104 thereof so that when portion 102 projects within slot portion 104 movement of link 92 relative to core portion 102 is prevented.

To the left of portion 102, slide element 97 is further reduced in diameter to form a cylindrical neck 106 having an axial length slightly greater than the thickness of link 92 and having a diameter slightly less than the width of slot 105 whereby link 92 may pivot about bolt 93 when neck 106 and slot 105 are aligned, as will be described. In addition, at the left end of neck 106 there is provided an integral, cylindrical cap 107 of a diameter approximately equal to that of slide portion 102.

With the arrangement described it is apparent that when solenoid 89 is energized, slide element 97 will be moved to the right to thereby position neck 106 in alignment with slot 105 to thereby free link 92 for pivotable movement about bolt 93.

Unlocking assembly 91 is located to the left of and in longitudinal alignment with, slide element 97 and extends a portion in a horizontal or leftward direction exteriorly of housing 87 and through a bushing 108 which is press fitted within a suitable opening in housing 87. That portion of assembly 91 which portrudes outwardly of housing 87 forms a button 109, the actuation of which effects a sliding movement of assembly 91 to the right. In addition, assembly 91 includes a shoulder 111 which abuts against bushing 108 and serves to maintain assembly 91 within housing 87, assembly 91 also includes a reduced diameter detent portion 112, to the right of shoulder 111, and a cap 113 at the right end of assembly 91, cap 113 embodying a central hollow or concavity 114.

Disposed perpendicularly to unlocking assembly 91 is a lock mechanism 115 which comprises a pin 116 knurled at its outer end and provided with a shoulder 117 which is slidably disposed within a suitable opening 118 in housing 87, pin 116 being maintained within housing 87 by a threaded bushing 119 which embodies a central hexagonal portion 121 whereby bushing 119 may be turned into a suitably threaded outer portion of opening 118. Disposed about pin 116 is a spring 122 which exerts its bias against the inner end of bushing 119 and against shoulder 117 to thereby urge pin 116 inwardly against unlocking assembly 91 and seat the inner end of pin 116 within concavity 114 of cap 113. It is apparent that upon inward actuation of button 109, assembly 91 will move inwardly displacing cap 113 to the right and enabling pin 116 to snap inwardly into detent portion 112 to thereby lock assembly 91 in its inward position. This inward movement will also force cap 113 of assembly 91 against cap 107 of slide element 97 to effect displacement thereof to the right against the bias of spring 99 to position neck portion 106 within slot 105 of link 92. To unlock or release assembly 91 the knurled end of pin 116 may be grasped and pulled outwardly whereby spring 99 will exert its bias to force element 97, and consequently assembly 91, to the left, release of pin 116 thereupon effecting the reseating of pin 116 within concavity 114.

As illustrated in Figures 1 and 2, solenoid assembly 86 is associated with throttle control assemblies 11 and 12 through a connecting element 123 which is pivotally connected at one end to link 92 and at the other end to a crank 124, crank 124 in turn being rigidly secured, as by welding, to shaft 69. Connecting element 123 is provided with a threaded interconnection or turnbuckle adjustment 125 whereby the length of element 123 may be adjusted as desired. With this arrangement it is noted that when T handle 64 of either assembly 11 or 12 is pulled outwardly, with consequent rotation of shaft 69 counterclockwise as viewed in Figure 2, element 123 normally transmits such rotative movement to link 92. However, this operation cannot be effected when solenoid 89 is de-energized since reduced diameter portion 102 of slide element 97 will then be in its normal position within the enlarged portion 104 of slot 105 whereby link 92 is restrained against movement; consequently, shaft 69 cannot be rotated and T handle 64 is restrained from being pulled outwardly. On the other hand, when solenoid 89 is energized, slide element 97 is pulled to the right by core 95 against the bias of spring 99, to thereby position neck 106 in alignment with slot 105 of link 92 whereby pivotal movement of link 92 is obtainable, and consequently T handle 64 is capable of being moved.

In the event that the means (not shown) employed for energizing solenoid 89 should fail to operate, or in the event that solenoid 89 itself should malfunction, T handle 64 can still be freed for movement through the independent manual operation of the unlocking assembly 91. As before described, assembly 91 is capable of acting to position neck 106 in alignment with link 92 whereby link 92 is free to pivot as described. More specifically, manual depression of button 109 by the operator will move unlocking assembly 91 to the right to press its cap 13 against cap 107, consequently moving slide element 97 to the right and positioning neck 106 in alignment with link 92. Simultaneously, pin 116 slides from concavity 114 into detent portion 112 to maintain unlocking assembly 91 in its inward position.

It is understood that manual actuation of unlocking assembly 91 is an emergency measure to be used only in the event of malfunctioning as stated. For this reason it is desirable for ground maintenance personnel to be apprised of the fact that such malfunctioning has occurred, and the readily apparent inward position of unlocking assembly 91 accomplishes this. To insure that the assembly 91 is maintained in its locked inward position until investigation of the malfunctioning has been made by maintenance personnel, a cap 126 is threaded over the outer threaded portion of bushing 119 and suitably sealed in this position whereby the seal must be broken and the cap 126 removed before pin 116 may be grasped and pulled outwardly to enable assembly 91 to be unlocked or moved to the left by the bias of spring 87 when neck 106 has been positioned in alignment with the enlarged end 104 of slot 105. It is contemplated that periodic checks will be made by maintenance personnel of the position of button 109 to determine whether emergency actuation of assembly 91 had been necessary, these periodic checks being in addition to the regular and conventional reports of the operator with regard to the functioning of the aircraft.

The means used for energizing solenoid 89 to effect operation of solenoid assembly 86 are not restricted to any particular apparatus. Any means utilized, however, should as is well known in the art, be coordinated with the landing of the aircraft whereby energization only occurs when the aircraft is on the ground. A common expedient in the art is to employ a switch, electrically interconnected with the solenoid 89, which is located at the retractable landing gear, and which is adapted to be actuated in conventional fashion by elements of the landing gear when contact is made with the ground. Reference may be had to United States Patent No. 2,446,700 for a suitable switch and landing gear arrangement which may be employed herein.

The operation of the throttle control mechanism of the present invention to effect control of one engine, which here will be assumed to be that engine associated with assembly 11, will now be described:

Assuming, in assembly 11, throttle lever 13 to be in its neutral or idling position, as indicated at A in Figure 2, throttle lever 13 may be moved forward or counter-clockwise from position A to position B in order to effect an increase in the speed of its associated engine with the propeller in forward pitch. This forward position is the in-flight position of lever 13 with full power on, and it is noted that with throttle lever 13 in this position, throttle arm 15 of assembly 11 is in the position indicated at B'; which position of arm 15 prevents any counterclockwise movement of locking hook 16 which may be attempted by an operator who unwittingly seeks to pre-arm the system by pulling out T handle 64 before the engine is idling. It is seen that in order to arm the system for reversing, the throttle arm 15 must be in its neutral or idle position.

Assuming the aircraft is about to descend for a landing, and the engine is at full throttle, the operator throttles back the engine by moving throttle lever 13 from position B to position A, consequently moving throttle arm 15 from position B' to position A'. Inadvertent movement at this time of lever 13 to engine reversing position C' is desirably prevented through the action of latching head 52 of throttle arm 15 striking and being halted by shoulder 51 of locking hook 16.

As the aircraft approaches the ground for landing, the pilot will throttle back the engine to thereby locate throttle arm 15 in its neutral or idle position. Next, when the aircraft is firmly on the ground the switch associated with the landing gear will actuate solenoid 89, and its core 95 will position neck 106 in alignment with slot 105 of link 92 to thereby free link 92 for pivotal movement. The operator then arms the system for reversing operation by pulling T handle 64, thereby causing rotation of shaft 69, such rotation of shaft 69 being unrestricted by solenoid assembly 86 since link 92 is free to pivot in correspondence with the rotation of shaft 69. In addition, the rotation of shaft 69 effects a counterclockwise pivoting movement of locking hook 16, freeing throttle arm 15 for movement by lever 13 to its reversing position C'. Thus, the pilot may operate the engine of the aircraft with the propeller in reverse pitch as desired.

Resetting of the system is effected by movement of throttle lever 13 to position A to thereby locate throttle arm 15 at A'. As is apparent, movement of lever 13 from position A to position B to increase the speed of the engine may be had since there is no interference offered by hook 16 to arm 15 in that direction.

Assembly 11 and its control of its associated engine has been described. It is apparent that assembly 12 will operate in like manner to control the engine associated therewith.

It will be apparent that inadvertent manual actuation of the propeller reversing mechanism is thus substantially prevented by the present invention.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. Engine throttle control apparatus adapted for effecting the operation of propeller reversing mechanism, said apparatus comprising a throttle lever having a first position and a second position and being adapted for movement from said first position to said second position to thereby effect operation of the propeller reversing mechanism, a pivotable arm, means operatively interconnecting said lever and said arm whereby there is correspondence between the positions and movements of said arm and said lever, releasable locking means associated with said arm for normally preventing movement of said arm corresponding to movement of said lever from said first position to said second position, manually operable override means separately operable from said lever for releasing said releasable locking means, and remote controlled means for normally rendering said override means inoperable until the aircraft is on the ground.

2. Engine throttle control apparatus adapted for effecting the operation of propeller reversing mechanism, said apparatus comprising a throttle lever having a first position and a second position and being adapted for movement from said first position to said second position to thereby effect operation of the propeller reversing mechanism, a pivotable arm, means operatively interconnecting said lever and said arm whereby there is correspondence between the positions and movements of said arm and said lever, releasable first locking means associated with said arm for normally preventing movement of said arm corresponding to movement of said lever from said first position to said second position, manually operable override means for releasing said releasable first locking means, and remote controlled means for normally rendering said override means inoperable until the aircraft is on the ground, said remote controlled means comprising movable second locking means and solenoid means adapted to be energized upon landing of the aircraft, said solenoid means being adapted to normally restrain said second locking means from movement, said second locking means having an interconnection with said override means and normally adapted to prevent operation thereof until released for movement upon energization of said solenoid means.

3. Engine throttle control apparatus adapted for effecting the operation of propeller reversing mechanism, said apparatus comprising means actuable for effecting the operation of the propeller reversing mechanism, an actuable throttle lever having neutral and reverse positions and adapted for effecting actuation of said means when moved from neutral toward its reverse position, a movable arm having a reverse position, means connecting said lever to said arm for common movement, pivotally mounted locking means adapted for engagement with said arm to normally prevent movement of said arm to its reverse position and thereby prevent actuation of said lever toward its reverse position, release means manually operable for effecting disengagement of said locking means and said arm, said release means comprising a manually actuable member and linkage means, said linkage means interconnecting said manually actuable member and said pivotally mounted locking means, and remote controlled means for normally rendering said release means inoperable until the aircraft is on the ground.

4. Engine throttle control apparatus adapted for effecting the operation of propeller reversing mechanism, said apparatus comprising means actuable for effecting the operation of the propeller reversing mechanism, an actuable throttle lever having neutral and reverse positions and adapted for effecting actuation of said means when moved from neutral toward its reverse position, a movable arm having a reverse position, means connecting said lever to said arm for common movement, pivotally mounted first locking means adapted for engagement with said arm to normally prevent movement of said arm to its reverse position and thereby prevent actuation of said lever toward its reverse position, resilient means for urging said locking means into its locking position, and release means manually actuable for moving said locking means against the force of said resilient means to thereby effect disengagement of said locking means and said arm, said release means comprising a manually actuable member and linkage means, said linkage means interconnecting said manually actuable member and said pivotally mounted locking means, and remote controlled means for normally rendering said release means inoperable until the aircraft is on the ground, said remote controlled means comprising movable second locking means and solenoid means adapted to be energized upon landing of the aircraft, said solenoid means being adapted to normally restrain said second locking means from movement, said second locking means having an interconnection with said release means and normally adapted to prevent operation thereof until released for movement upon energization of said solenoid means.

5. In an apparatus for controlling engine power and for effecting the operation of propeller reversing mechanism, pivotally mounted control means characterized by neutral and reverse positions and adapted for movement therebetween, means for actuating said control means, pivotally mounted locking means engageable with said control means for normally preventing movement of said control means from its neutral toward its reverse position, resilient means for urging said locking means into its locking position, and manually actuable release means for moving said locking means against the force of said resilient means to disengage said locking means from said member to thereby permit movement of said control means from its neutral position toward its reverse position, said release means comprising a manually actuable member having a resilient connection with said pivotally mounted locking means.

6. Engine throttle control apparatus adapted for effecting the operation of propeller reversing mechanism, said apparatus comprising means actuable for effecting the operation of the propeller reversing mechanism, an actuable throttle lever having neutral and reverse positions and adapted for effecting actuation of said means when moved from neutral toward its reverse position, a pivotal arm movable between a neutral position and a reverse position, means connecting said lever to said arm for common movement, pivotally mounted locking means adapted for engagement with said arm to normally prevent movement of said arm to its reverse position and thereby prevent actuation of said lever toward its reverse position, resilient means for urging said locking means into its locking position, and release means manually actuable for effecting disengagement of said locking means and said arm, said release means comprising a manually actuable rod member and linkage means having a resilient connection with said pivotally mounted locking means.

7. In an apparatus for controlling engine power and for effecting the operation of propeller reversing mechanism, pivotally mounted control means characterized by neutral and reverse positions and adapted for movement therebetween, means for actuating said control means, pivotally mounted first locking means engageable with said control means for normally preventing movement of said control means from its neutral toward its reverse position, resilient means for urging said first locking means into its locking position, manually actuable release means for moving said first locking means against the force of said resilient means to disengage said first locking means from said member to thereby permit movement of said control means from its neutral position toward its reverse position, said release means comprising a manually actuable member having a resilient connection with said pivotally mounted first locking means, and remote controlled means for normally rendering said release means inoperable until the aircraft is on the ground, said remote controlled means comprising movable second locking means and solenoid means adapted to be energized upon landing of the aircraft, said solenoid means being adapted to normally restrain said second locking means from movement, said second locking means having an interconnection with said release means and normally adapted to prevent operation thereof until released for movement upon energization of said solenoid means.

8. Engine throttle control apparatus adapted for effecting the operation of propeller reversing mechanism, said apparatus comprising means actuable for effecting the operation of the propeller reversing mechanism, an actuable throttle lever having neutral and reverse positions and adapted for effecting actuation of said means when moved from neutral toward its reverse position, a pivotal arm movable between a neutral position and a reverse position, means connecting said lever to said arm for common movement, pivotally mounted first locking means adapted for engagement with said arm to normally prevent movement of said arm to its reverse position and thereby prevent actuation of said lever toward its reverse position, resilient means for urging said first locking means into its locking position, release means manually actuable for effecting disengagement of said first locking means and said arm, said release means comprising a manually actuable rod member and linkage means having a resilient connection with said pivotally mounted first locking means, and remote controlled means for normally rendering said release means inoperable until the aircraft is on the ground, said remote controlled means comprising movable second locking means and solenoid means adapted to be energized upon landing of the aircraft, said solenoid means being adapted to normally restrain said second locking means from movement, said second locking means having an interconnection with said release means and normally adapted to prevent operation thereof until released for movement upon energization of said solenoid means.

9. In an apparatus for controlling engine power and for effecting the operation of propeller reversing mechanism, control means characterized by neutral and reverse positions and adapted for movement therebetween, latch means associated with said control means and being normally resiliently urged to latched position, means for actuating said control means, movably mounted locking means engageable with said control means for normally preventing movement of said control means from its neutral toward its reverse position, said locking means when in locking engagement with said control means also simultaneously restraining said latch means in unlatched position, resilient means for urging said locking means into its locking position, and manually actuable release means for moving said locking means against the force of said resilient means to disengage said locking means from said control means to release said latch means to permit movement thereof to its latched position whereby said latch means prevents return of said locking means to its unlocked position and thereby permit movement of said control means from its neutral position toward its reverse position.

10. In a multi-engine aircraft, throttle control apparatus comprising a plurality of control assemblies, one associated with each engine and operable for controlling the power thereof and for effecting the operation of propeller reversing mechanism, each of said control assemblies comprising means actuable for operating propeller reversing mechanism, an actuable throttle lever having neutral and reverse positions and adapted for effecting actuation of said control means when moved from neutral toward its reverse position, a movable arm having a reverse position, means connecting said lever to said arm for common movement, locking means adapted for engagement with said arm to normally prevent movement of said arm to its reverse position and thereby prevent actuation of said lever toward its reverse position, release means manually actuable for effecting disengagement of said locking means and said arm, each of said control assemblies including an actuable throttle lever having neutral and reverse positions for each of the other engines, means interconnecting corresponding throttle levers of each of said plurality of control assemblies to thereby provide for operation of any of said control assemblies by movement of an interconnected throttle lever from neutral toward its reverse position, and means for interconnecting the release means of each of said plurality of control assemblies to thereby provide for common actuation of all of said release means upon actuation of any of said release means.

11. In a multi-engine aircraft, throttle control apparatus comprising a plurality of control assemblies, one associated with each engine and operable for controlling the power thereof and for effecting the operation of propeller reversing mechanism, each of said control assemblies comprising means actuable for operating propeller reversing mechanism, an actuable throttle lever having neutral and reverse positions and adapted for effecting actuation of said control means when moved from neutral toward its reverse position, a movable arm having a reverse position, means connecting said lever to said arm for common movement, pivotally mounted locking means adapted for engagement with said arm to normally prevent movement of said arm to its reverse position and thereby prevent actuation of said lever toward its reverse position, resilient means for urging said locking means into its locking position, release means manually actuable for moving said locking means against the force of said resilient means to thereby effect disengagement of said locking means and said arm, said release means comprising a manually actuable member and linkage means, said linkage means interconnecting said manually actuable member and said pivotally mounted locking means, each of said control assemblies including an actuable throttle lever having neutral and reverse positions for each of the other engines, and means interconecting corresponding throttle levers of each of said plurality of control assemblies to thereby provide for operation of any of said control assemblies by movement of an interconnected throttle lever from neutral toward its reverse position.

12. In a multi-engine aircraft, throttle control apparatus comprising a plurality of control assemblies, one associated with each engine and operable for controlling the power thereof and for effecting the operation of propeller reversing mechanism, each of said control assemblies comprising control means actuable for operating propeller reversing mechanism, an actuable throttle lever having neutral and reverse positions and adapted for effecting actuation of said control means when moved from neutral toward its reverse position, a movable arm having neutral and reverse positions, means connecting said lever to said arm for common movement, pivotally mounted locking means adapted for engagement with said arm to normally prevent movement of said arm to its reverse position and thereby prevent actuation of said lever toward its reverse position, resilient means for urging said locking means into its locking position, manually actuable release means comprising a manually actuable member and linkage means, means for interconnecting the linkage means of each of said plurality of control assemblies to thereby provide for operation of all of said release means upon actuation of the manually actuable member of any of said release means, each of said linkage means having a resilient connection with its associated pivotally mounted locking means and movable to operate said locking means into its unlocked position against the force of its resilient means when said locking means is free to move to thereby effect disengagement of said locking means and said arm, and resiliently movable to permit operation of the locking means of the other assemblies when its associated locking means is constrained against movement.

13. In a multi-engine aircraft, throttle control apparatus comprising a plurality of control assemblies, one associated with each engine and operable for controlling the power thereof and for effecting the operation of propeller reversing mechanism, each of said control assemblies comprising control means actuable for operating propeller reversing mechanism, an actuable throttle lever having neutral and reverse positions and adapted for effecting actuation of said control means when moved from neutral toward its reverse position, a movable arm having neutral and reverse positions, means connecting said lever to said arm for common movement, pivotally mounted locking means adapted for engagement with said arm to normally prevent movement of said arm to its reverse position and thereby prevent actuation of said lever toward its reverse position, resilient means for urging said locking means into its locking position, manually actuable release means for moving said locking means against the force of its resilient means to thereby effect disengagement of said locking means and said arm, said release means comprising a manually actuable member and linkage means, said linkage means having a resilient connection with said pivotally mounted locking means whereby said linkage means is adapted for yieldable movement by said manually actuable member when said locking means is constrained against movement, each of said control assemblies including an actuable throttle lever having neutral and reverse positions for each of the other engines, means for interconnecting corresponding throttle levers of each of said plurality of control assemblies to thereby provide for operation of any of said control assemblies by movement of an interconnected throttle lever from neutral toward its reverse position, and means for interconnecting the linkage means of each of said plurality of control assemblies to thereby provide for operation of all of said release means upon actuation of the manually actuable member of any of said release means.

References Cited in the file of this patent

UNITED STATES PATENTS

| | | |
|---|---|---|
| 1,694,220 | Jenkins | Dec. 4, 1928 |
| 2,593,910 | Morris et al. | Apr. 22, 1952 |
| 2,594,888 | Elliott | Apr. 29, 1952 |
| 2,594,927 | Holt | Apr. 29, 1952 |

FOREIGN PATENTS

| | | |
|---|---|---|
| 625,176 | Great Britain | June 23, 1949 |